United States Patent [19]
McKinnon

[11] Patent Number: 5,535,915
[45] Date of Patent: Jul. 16, 1996

[54] METER PIT

[76] Inventor: Robert M. McKinnon, P.O. Box 648, Bedford, Tex. 76021-0648

[21] Appl. No.: 518,163

[22] Filed: Aug. 23, 1995

[51] Int. Cl.⁶ .................................................. B65D 25/24
[52] U.S. Cl. ..................... 220/484; 220/571; 220/DIG. 6
[58] Field of Search .................................. 220/484, 354, 220/355, 326, 357, 571, DIG. 6

[56] References Cited

U.S. PATENT DOCUMENTS

| | | | |
|---|---|---|---|
| 3,952,908 | 4/1976 | Carson | 220/484 |
| 4,717,036 | 1/1988 | Dundas | 220/484 |
| 4,747,453 | 5/1988 | Howard, Sr. | 220/484 |
| 5,249,697 | 10/1993 | McKinnon | 220/484 |
| 5,333,750 | 8/1994 | McKinnon | 220/484 |

*Primary Examiner*—Joseph M. Moy
*Attorney, Agent, or Firm*—Arthur F. Zobal

[57] ABSTRACT

The meter pit is formed by a hollow cylindrical wall having a top end and a bottom end with top and bottom openings leading to the interior thereof. The top end has structure forming upper spaced apart slots extending outward from the upper opening with the slots having a radial dimension capable of receiving the bottom lugs of annular lid covers which are located at different radial positions.

3 Claims, 3 Drawing Sheets

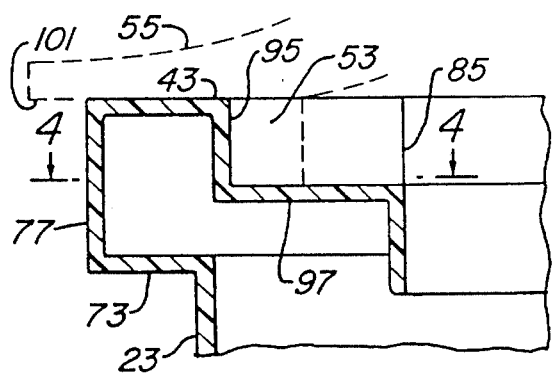
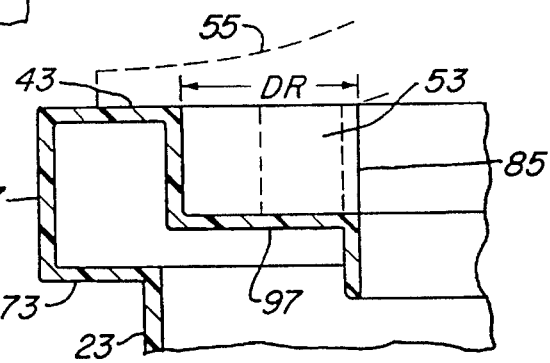
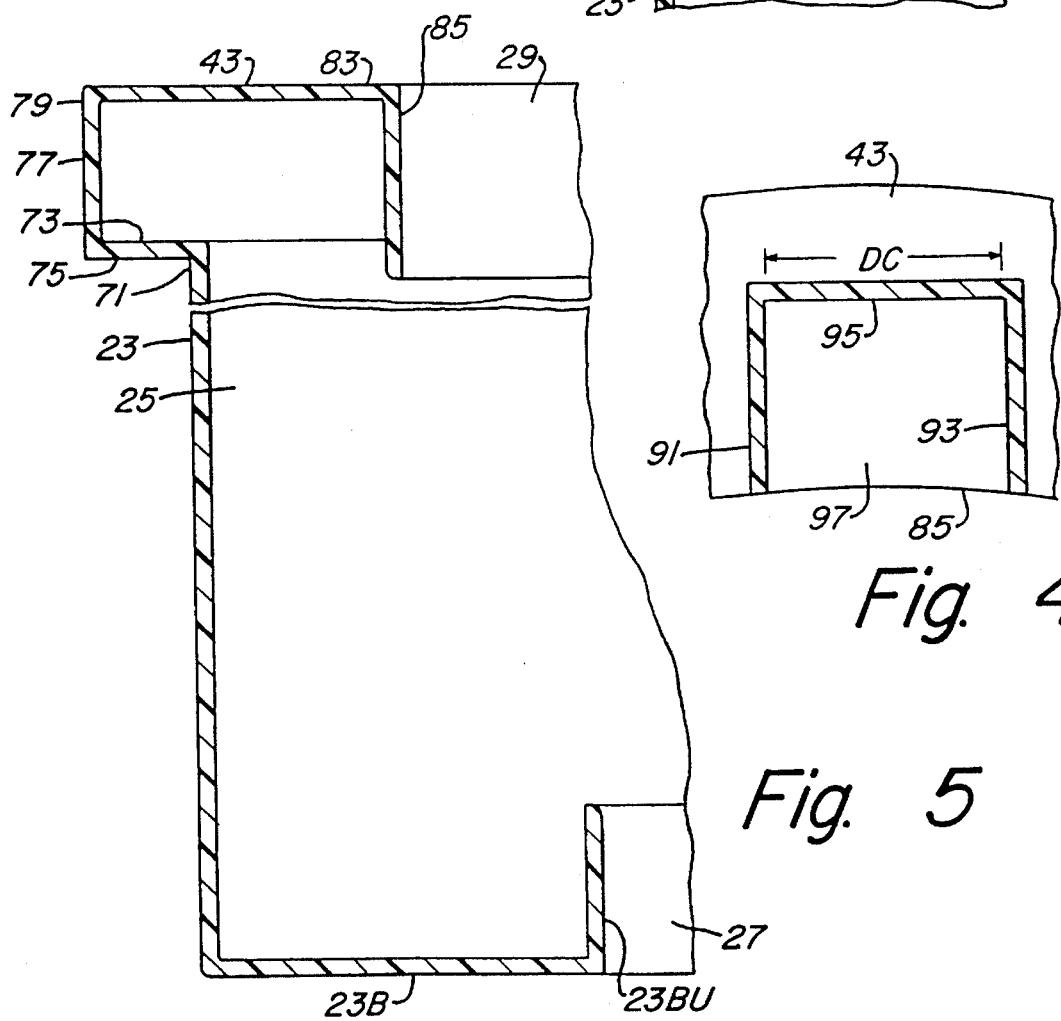

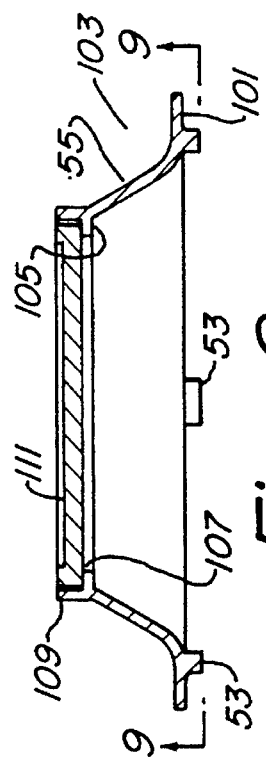
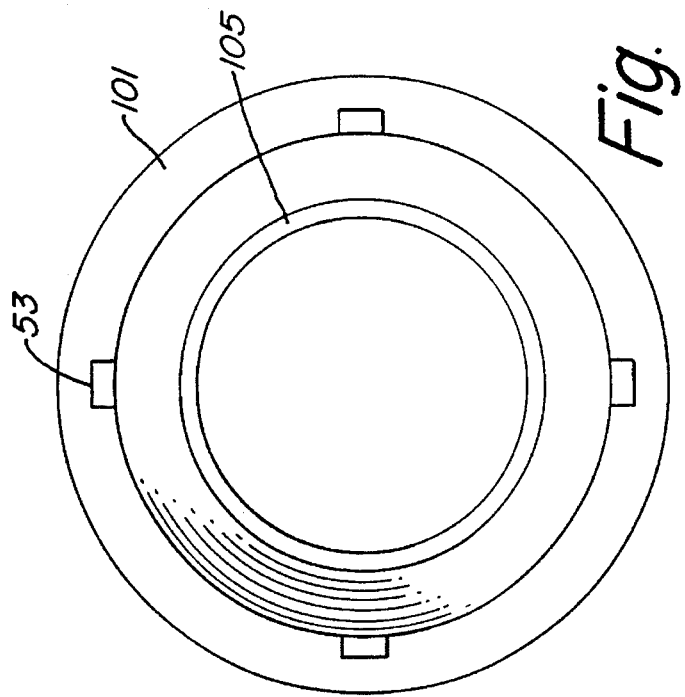
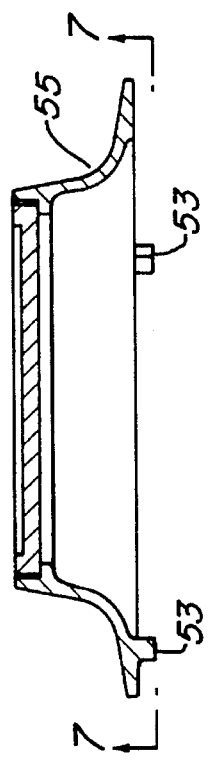
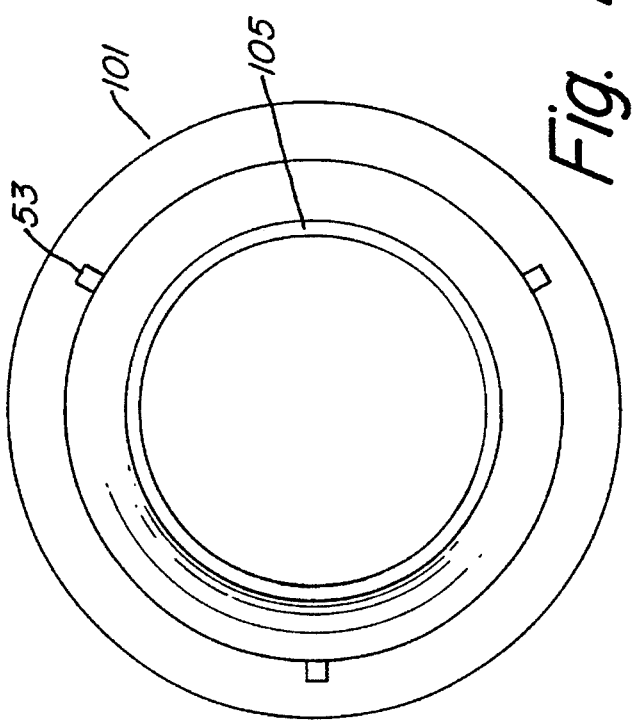

METER PIT

BACKGROUND OF THE INVENTION

1. Field of the Invention

The invention relates to a structure to be located the ground for surrounding and protecting a meter such as a water meter.

2. Description of the Prior Art

The known water meter pits have different dimensions each of which receives a given size lid. This results in increased meter pit production and storage costs.

SUMMARY OF THE INVENTION

It is an object of the invention to provide a meter pit having upper structure for receiving different size lid covers which are standard in the industry.

The upper end of the meter pit comprises structure forming upper spaced apart slots extending outward from the upper opening with the slots having a radial dimension capable of receiving the bottom lugs of lid covers which are located at different radial positions on the covers.

BRIEF DESCRIPTION OF THE DRAWINGS

FIGS. 3 and 10 are cross-sectional views of a slot of the upper end of the meter pit with lid covers shown partially in dotted lines and having lugs at different radial positions.

FIG. 4 is a cross-sectional view of FIG. 3 taken along lines 4—4 thereof.

FIG. 5 is a cross-sectional view of the upper end and the lower end of the meter pit.

FIG. 6 is a cross-sectional view of one type of lid cover that the meter pit of the invention can receive.

FIG. 7 is a plan view of the bottom of the lid of FIG. 6 as seen along lines 7—7 thereof.

FIG. 8 is a cross-sectional view of another type of lid that the meter pit of the invention can receive.

FIG. 9 is a plan view of the bottom of the lid of FIG. 8 as seen along lines 9—9 thereof.

DESCRIPTION OF THE PREFERRED EMBODIMENT

Figure 1:
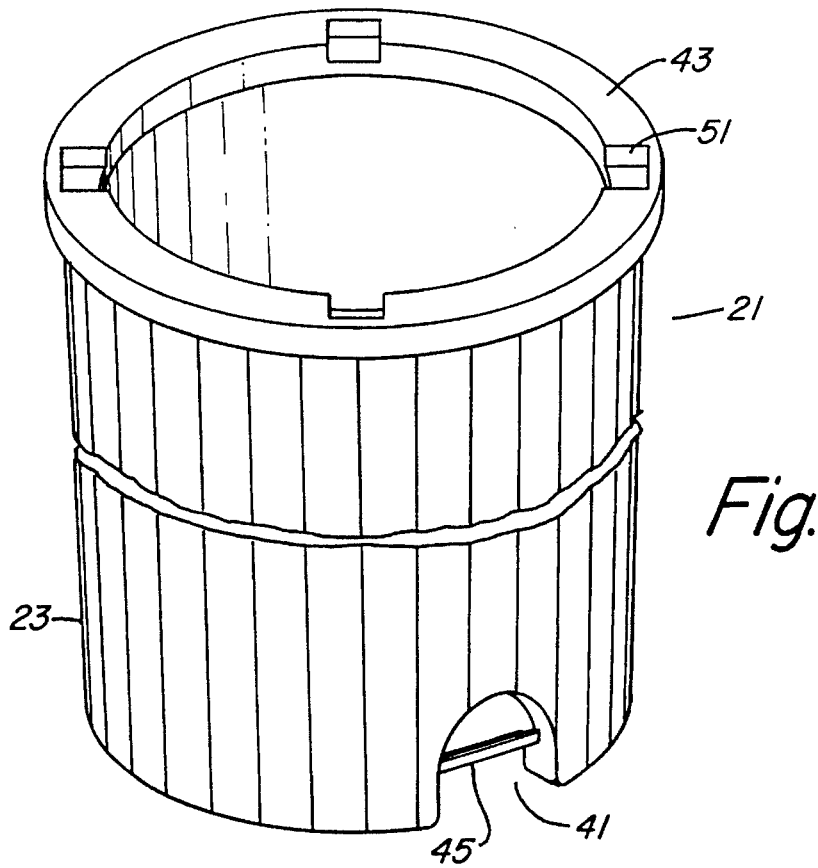
FIG. 1 is an isometric view of one embodiment of the meter pit of the invention.

Referring now to the drawings, the meter pit with an upper end of one embodiment is illustrated at 21. It comprises a hollow cylindrical wall 23 having an interior space 25 with a circular bottom opening 27 and a top circular opening 29 leading to the interior 25. At the bottom, the wall 23 extends inward at 23B and then upward at 23BU defining the bottom opening 27. Two openings 41 at the bottom are formed through the structure for receiving the inlet and outlet pipes of a water meter to be located below ground level. Members 45 are break away members which are removed when the openings 41 are located to receive the meter pipe. In using the meter pit, a hole will be formed in the ground around the meter with the meter pipe located in the openings 41. The upper wall 43 of the meter pit will be located at ground level.

Figure 2:
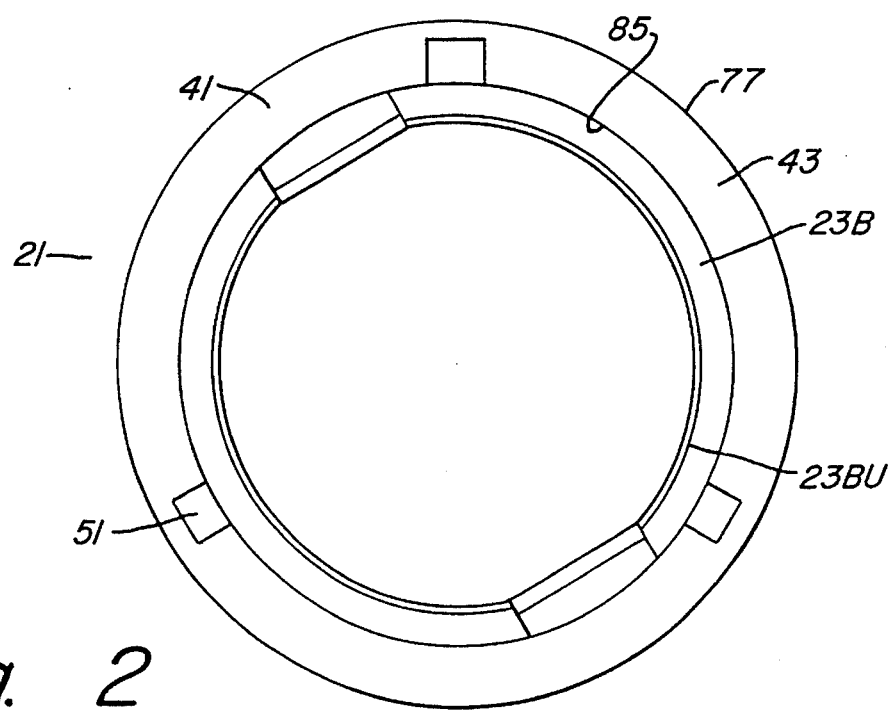
FIG. 2 is a plan view of the top of another embodiment of the meter pit of the invention.

The upper wall structure of the meter pit of FIG. 2 has three slots 51 with the centers of adjacent slots spaced 120 degrees apart for receiving the three lugs 53 of a lid cover 55 as shown in FIGS. 6 and 7. In the embodiment of FIG. 1, the upper wall has four slots 51 with the centers of adjacent slots spaced 90 degrees apart for receiving the four lugs 53 of a lid cover as shown in FIGS. 8 and 9.

The upper structure in which the slots 51 are formed for receiving the lid cover lugs 53 and for supporting the lid cover 55 now will be described. Referring to FIGS. 3, 4, and 5, the cylindrical wall 23 has an upper circular edge 71 with a given inner diameter. An upper annular wall 73 extends radially outward from the edge 71 to an outer edge 75. An outer cylindrical wall 77 extends upward from the edge 75 to a top circular edge 79. A top annular wall 43 extends radially inward from the top edge 79 to an inner edge 83. An inner cylindrical wall 85 extends downward from the edge 83 to a level lower than the wall 73 defining the circular opening 29 which has an inside diameter less than the inner diameters of walls 23 and 77.

Each slot 51 is formed by two spaced apart side walls 91 and 93 extending inward from the inner cylindrical wall 85 to an intermediate outer wall 95 spaced inward from the wall 77. Walls 91, 93, and 95 extend downward from the wall 43 to a bottom slot wall 97 which joins the wall 85 at a level below the level of wall 43 and above the level of wall 73. Thus each slot 51 of the embodiments of FIGS. 1 and 2 extends radially outward from the wall 85 sufficient to receive the lugs 53 of a lid cover 55 as shown in FIG. 3 or the lugs 53 of a lid cover 55 as shown in FIG. 10. In the lid cover of FIG. 3, the lugs 53 are located at a greater radius from the center of the cover than the lugs of the lid cover of FIG. 10.

In one embodiment, the meter pit 21 is formed of a suitable plastic material. The walls 23, 23B, 23BU, 73, 77, 43, 85, 91, 93, 95, and 97 each have a thickness of about 3/16 of an inch. The radial distance DR of each slot 51 is 14/16 of an inch and the distance DC of each slot 51 is 1 6/16 inches. The outside diameters of walls 23 and 77 are 19 3/4 inches and 21 1/4 inches respectively. The inside diameter of wall 85 is 17 3/4 inches. The outer height of wall 77 is 1 inch. The inside heights of walls 95 and 85 are 1/2 of an inch and 1 1/4 inches respectively. The total height of the meter pit is 24 inches. Thus the meter pit will accept lid covers having lugs 53 with outer edges located at diameters greater than 17 3/4 inches and less than 18 1/2 inches. The lid covers 55 of FIGS. 3 and 10 will be of the type shown in FIGS. 8 and 9 for use with the meter pit of FIG. 1 and will be of the type shown in FIGS. 6 and 7 for use with the meter pit of FIG. 2.

It is to be understood that the meter pit of the invention can have dimensions different from those listed above.

As shown in FIGS. 6–9, each of the lid covers 55 comprises an annular bottom wall 101 from which the lugs 53 extend and which is coupled to a cone shaped wall 103. At the top of the cone shaped wall 103 an annular wall 105 extends inward forming a circular opening 107 and a cylindrical wall 109 extends upward for removably receiving a circular lid 111 for coveting the opening 107. The cover 55 and lid 111 may be formed of metal or plastic. When the lid cover is located on the meter pit, the annular wall 101 will rest on the wall 43 and the lugs 53 will be located in the slots 51.

I claim:

1. A meter pit comprising:

a hollow surrounding wall having a top end and a bottom end with top and bottom openings leading to the interior of said surrounding wall, said top end of said surrounding wall having an upper circular edge with a given inner diameter, an upper annular wall extending outward from said upper circular edge to an outer edge, an outer cylindrical wall extending upward from said outer edge of said upper annular wall, to a top circular edge, a top annular wall extending inward from said top circular edge to an inner edge, an inner cylindrical wall extending downward from said inner edge defining said top opening with an inside diameter less than said inner diameter of said upper circular edge, a plurality of spaced apart slots formed in said top annular wall and said inner cylindrical wall for receiving lugs of an upper lid cover, each slot comprises:

two spaced apart side walls extending outward from said inner cylindrical wall to an intermediate outer wall spaced inward from said outer cylindrical wall, said two spaced apart side walls and said intermediate wall extending downward from said top annular wall to a bottom slot wall which joins said inner cylindrical wall above the level of said upper annular wall such that said slot extends from said inner cylindrical wall outward to said intermediate wall.

2. The meter pit of claim 1, wherein:

said plurality of slots comprise three spaced apart slots which define three equal angles from the center of said top opening respectively.

3. The meter pit of claim 1, wherein:

said plurality of slots comprise four spaced apart slots which define four equal angles from the center of said top opening respectively.

* * * * *